Dec. 14, 1965 T. W. MAUGANS 3,223,926

REMOTE CONTROLLED PUSH BUTTON TUNER

Filed Feb. 13, 1963 2 Sheets-Sheet 1

INVENTOR.
Terrance W. Maugans

BY

Robert E. Fowler

ATTORNEY

Dec. 14, 1965 T. W. MAUGANS 3,223,926

REMOTE CONTROLLED PUSH BUTTON TUNER

Filed Feb. 13, 1963 2 Sheets-Sheet 2

INVENTOR.
Terrance W. Maugans
BY
Robert E. Fowler
ATTORNEY 3,223,926

REMOTE CONTROLLED PUSH BUTTON TUNER

Terrance W. Maugans, Kokomo, Ind., assignor to General Motors Corporation, Detroit, Mich., a corporation of Delaware Filed Feb. 13, 1963, Ser. No. 258,344
4 Claims. (Cl. 325—390)

This invention relates to means for tuning radio receiving apparatus and more particularly to auxiliary tuning means which may be located at a point remote from the radio receiving apparatus to tune the same to a plurality of predetermined set stations.

It is currently common practice to mount a radio receiver in the instrument panel of automobiles where it is within comparatively easy reach of both the driver and any other occupants of the front seat. These radio receivers normally include an On-Off switch and volume control, a manual tuning means and a plurality of so-called push buttons carry indexing cams which may be initially adjusted to tune the receiver to certain desired stations. Thereafter, upon forcing any one of these push buttons inwardly to its limit the station to which the mechanism had been initially adjusted would be tuned in. Most of the domestic receivers of this type include five push buttons and these are usually adjusted to tune in five of the most commonly listened to stations. Since the current domestic automobiles have considerable width, it is somewhat of a stretch to reach over the center of the instrument panel, or beyond, from the driver's seat to control the radio. Furthermore, any distraction from driving may cause an accident and the least effort and movement required by the driver for the operation of the radio is desired. Further, it may be desired to locate the radio receiver at some other point.

It is an object in making the current invention to provide means for automatically tuning in stations already preset on a radio receiver by auxiliary push buttons in a remote unit at a position adjacent to the hands of the driver in the normal operation of the car such, for example, as the center of the steering column.

It is a further object in making this invention to provide a remote control panel for a radio receiver including a plurality of push buttons which will tune the receiver to preset stations.

It is a still further object in making this invention to provide a remote control push button panel for tuning the radio receiver which can be mounted in the center of the steering column which in nowise will affect the normal push button operation of the receiver but will provide an independent control station.

With these and other objects in view which will become apparent as the specification proceeds, my invention will be best understood by reference to the following specification and claims and the illustrations in the accompanying drawings, in which:

As mentioned earlier in this specification conventional automotive radio receivers currently on the market include a series of so-called push buttons on reciprocating slides having adjustable cam means which can be initially adjusted to tune the radio receiver to certain different favorite stations. Such a tuner is shown in Schwarz, et al. 2,494,008, issued January 10, 1950. This patent discloses a radio set including five push buttons 26 each of which is mounted on the end of a slide 6 which can be depressed to tune the tuning means of the receiver by movement of the slide. When any one of the five push buttons is depressed adjustable cam means on that slide will move the tuning means of the radio receiver to a certain preset position and thus tune in the desired station. Each slide thus proceeds on to its "in tune" or "bottomed" position for this purpose.

Figures 1, 2, 3, 4:
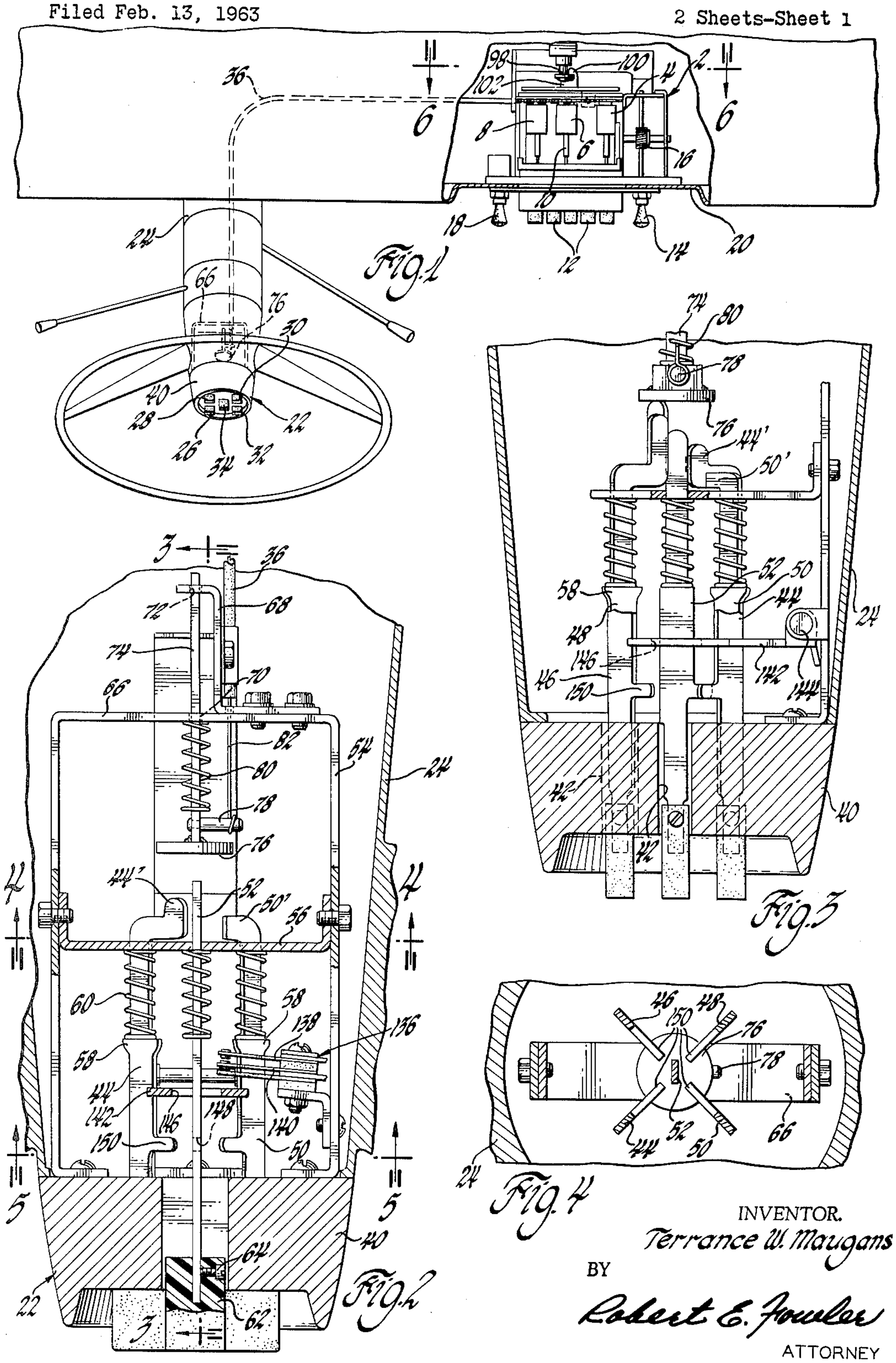
FIGURE 1 shows a top view of a portion of the interior of a car with the instrument panel broken away showing the location of the receiver and its controls.
FIG. 2 is an enlarged sectional view through the remote control head mounted in the steering column.
FIG. 3 is a sectional view taken on line 3—3 of FIG. 2.
FIG. 4 is a sectional view taken on line 4—4 of FIG. 2.

Such a receiver is shown herein in FIG. 1 at 2 and it includes a series of tuning coils 4, 6, and 8 within which tuning cores 10 move to tune the receiver. When the push buttons 12 are forced inwardly, adjustable means on the slides as shown in the above identified Schwarz et al. patent move the cores 10 to the desired mechanical indexed position and the set is tuned. The receiver is also provided with a manual tuning knob 14 which drives the tuning means through a worm gear 16. On the lefthand side of the set there is provided an "On-Off" switch and volume control 18. Thus in the ordinary operation of the receiver 2 mounted in the instrument panel 20 as shown, the operator would turn on the "On-Off" switch 18 and then depress one of the push buttons 12 to mechanically index the receiving set to tune in a desired station and then listen to that station. As mentioned above, with the increased width of cars and the necessity of the driver to reach or stretch some distance in order to control the receiver it would be advantageous to provide additional local control means in a more accessible position. The present construction provides a remote control unit which can be mounted in the center of the steering column and is shown generally at 22 mounted on top of the steering column 24.

This remote control unit includes five push buttons 26, 28, 30, 32 and 34 which will control the receiver to bring in the same stations as those preset on the five push buttons 12 of the original receiver. The remote control unit 22 has two connections to the main radio receiver; one, a mechanical Bowden wire connection 36 and a second electrical connection 38 for connecting the switch on the remote control head with the actuating solenoid in the receiver to control the energization thereof. The general principle of operation of the remote control unit is to provide a plurality of push button slides, all of which differ in length so that when each is depressed it will move an actuating plunger member connected to the Bowden wire connector different distances. The Bowden wire in turn is connected to a selector plate on the rear face of the radio tuner on the receiver, and, as this selector plate moves into different positions will align with the different slides on the receiver to actuate the one momentarily aligned when the solenoid is actuated.

The actual physical construction of the remote control head provided for the above purposes is best shown in FIGS. 2 through 5. A face plate 40 adapted to fit on the end of the steering column 24 is provided with a series of openings or slots 42 through which the slides 44, 46, 48, 50 and 52 project and are supported for longitudinal movement. To the inner face of the head 40 there is fastened one end of a rectangular frame 54 which extends into the end of the steering column for a distance approximately double the length of most of the slides 44 to 52. A transverse supporting plate 56 is connected across the frame 54 intermediate its two ends and acts to support the inner ends of the reciprocating slides 44–52. Each of the slides 44 through 52 is provided with a shoulder portion such as 58 a short distance from its inner end which acts as a stop for a biasing spring 60 which encompasses the inner end of each slide, presses against the shoulder 58 and against the forward face of the plate 56 to bias each slide outwardly. A push button 62 is secured on the end of each slide by a set screw 64 or other suitable means. The configuration of the end of each slide 44 through 52 that projects through the plate 56 differs so that the total length of the same appearing beyond the plate is different, the object being that as each push button 62 is engaged to push its associated slide inwardly that movement will force a mechanical Bowden wire connection inward to different positions. The inner end 66 of the frame 54 supports an angled bracket 68. Both the angled bracket 68 and the end member 66 include aligned openings 70 and 72 through which rod 74 projects. This rod is adapted to reciprocate and to be spring biased forwardly. On the forward end, rod 74 carries an actuating disc or plate 76 large enough eo extend over the ends of all of the slides 44 to 52 and to be engaged by such inner ends when the same are pushed in. The rod 74 has a pin 78 secured thereto and the biasing spring 80 engages the pin support and the inner face of the frame member 66 to bias the plate 76 forwardly. One end of the Bowden wire 82 of the cable 36 is connected to the pin 78. Thus as the plate 76 moves up and down as shown in FIG. 2 the Bodwen wire will be moved within its sheath to actuate means to be described.

Figures 5, 6, 7:
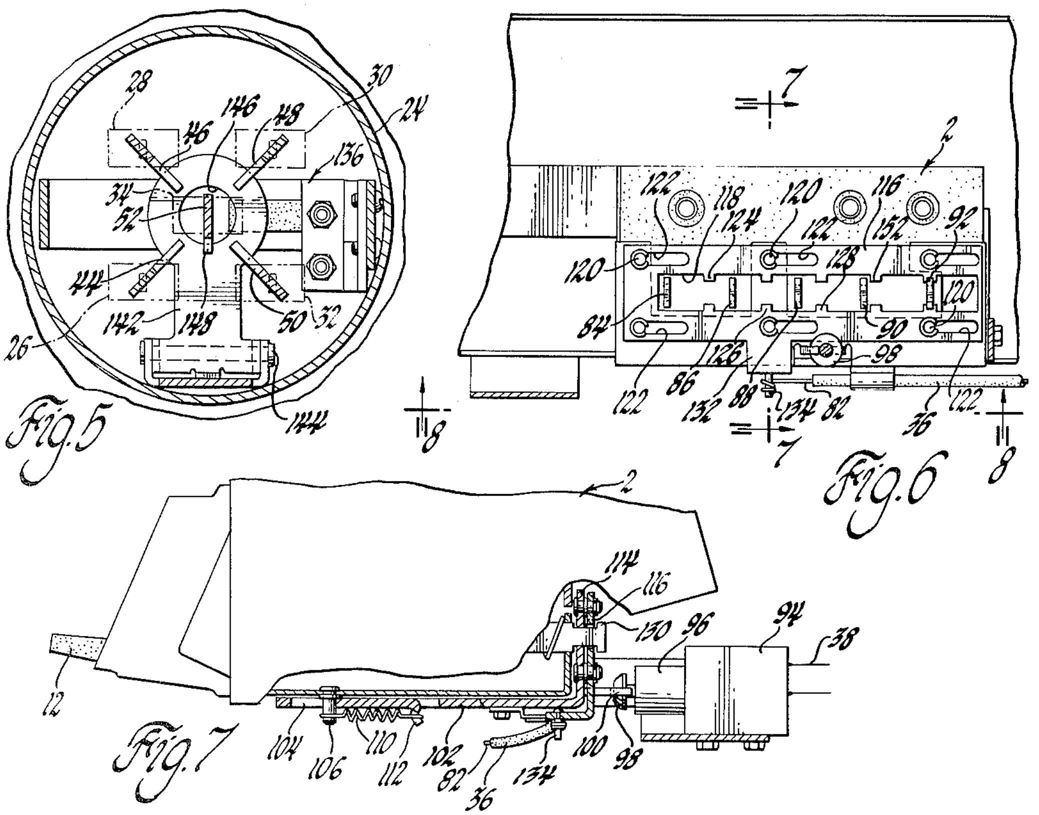
FIG. 5 is a sectional view taken on line 5—5 of FIG. 2.
FIG. 6 is a view of the rear face of the main radio receiver taken on line 6—6 of FIG. 1.
FIG. 7 is a sectional view through the receiver taken on line 7—7 of FIG. 6 and showing parts broken away and shown in section; and, FIG. 8 is an enlarged bottom view of the main radio receiver mounted in the instrument panel.
Figure 8:
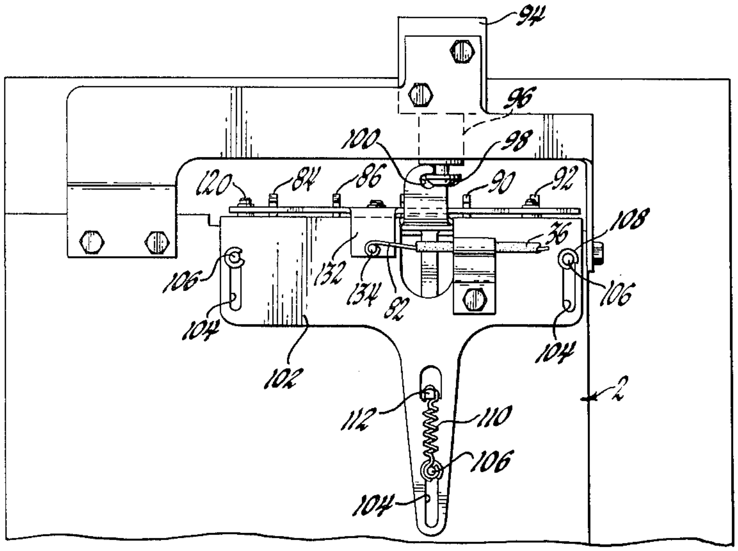

As previously mentioned the radio receiver per se includes tuning means having push buttons and slides which when depressed will tune the receiver to certain predetermined stations. The back of the receiver 2 mounted in the instrument panel is best shown in FIG. 6. There is clearly indicated in this figure the reciprocating actuating slides 84, 86, 88, 90 and 92. It is desired that when the driver actuates slide 44, for example, that the system be so constructed that slide 92 in the receiver will be actuated to tune in the station preset on that slide. Means must, therefore, be provided to cause this slide 92 to be actuated mechanically when the driver physically forces in slide 44. In order to rack, or pull these slides 84, 86, 88, 90 and 92 to their indexed position when desired, an actuating solenoid 94 is provided. This solenoid has a movable armature 96 whose head 98 fits into a flanged end 100 of a slidable plate 102. The slide plate 102 is reciprocably mounted on the bottom of the frame of the radio receiver as best shown in FIG. 8. It is provided with elongated slots 104 through which extend pins 106 from the frame of the radio receiver and around which are snapped enlarged washers 108 to maintain the plate in position but to permit reciprocation. One of the pins 106 acts as an anchor for one end of biasing spring 110 the opposite end of which is secured to an upturned tang 112 on the slidable plate 102. This biases the plate toward the front of the receiver. When the solenoid 94 is energized it attracts its armature 96 pulling the plate 102 against the spring bias toward the rear of the radio receiver chassis.

The slidable plate 102 has a flanged surface 114 which extends up around the rear face of the radio chassis and which has an elongated opening therein through which the slides 84, 86, 88, 90 and 92 project. Mounted for slidable transverse motion across the rear face of the radio chassis on this upturned portion 114 is a selector plate 116 which has a matching central aparture 118 through which the slides 84, 86, 88, 90 and 92 also project. This selector plate 116 is held in place on a series of supporting pins 120 which project through elongated slots 122. A series of inwardly projecting teeth 124 and 126, 128, etc. in matched pairs, project toward each other along the inner edge of the opening 118. The purpose of these teeth is to slip behind shoulders on enlarged head portions 130 of associated slides as shown in FIG. 7 to pull that designated slide out when the actuating solenoid 94 is energized. The end of each slide 84, 86, 88, 90 and 92 is formed in the manner shown in FIG. 7 and the matching teeth 124, 126, 128, etc. move behind a head portion 130 when so selected. Integral with the lower edge of the plate 116 there is provided an extension arm 132 which extends down to the bottom of the chassis and is then bent under and supports pin 134. The opposite end of the Bodwen wire cable 82 is secured to the pin 134 and movement of this cable, therefore, adjusts the transverse position of the plate 116 depending upon movement of the Bowden wire cable as determined by the position of the plunger plate 76 in the control head.

Returning now to the electrical control for energizing solenoid 94 there is provided in the control head per se a switch 136 consisting of two switch arms 138 and 140 insulatedly mounted with respect to each other and electrically connected in circuit with a source of power and the solenoid 94. These switch arms together with their contracts are so mounted as to normally be out of contact or open circuit electrically but capable of being moved into contact with each other when pressure is brought to bear on one. The switch operator consists of a pivoted lever 142 best shown in FIG. 5. This lever is pivotally mounted at 144 to a portion of the frame of the remote unit and includes a section having a central opening 146 through which the central slide 52 projects. This central slide is provided with a tang or projection 148 which is adapted to engage the forward surface of the pivoted lever 142 and move it toward the rear of the framework as the slide 52 is depressed against its spring bias. The lever 142 is so located in the frame that as it pivots toward the rear it will engage the switch arm 140 and move its contact into engagement with the contact on switch arm 138 to complete the electrical circuit. Each of the other slides 44, 46, 48 and 50 is provided in a similar manner with an inwardly projecting tang 150 which moves into engagement with the forward surface of the pivoted lever 142 when its associated slide is depressed. This action also causes a closing of the electrical switch 138–140. Thus when any of the push buttons on the remote head are depressed to the full extent of travel, the electrical switch will be closed due to the engagement of either tang 148 or one of the tangs 150 on the pivoted actuating lever 142.

The closing of the switch 138–140 will cause an energization of the solenoid 94 which will attract its armature 96, pulling the slide 102 to the rear. This will also move the transverse selector slide 116 with it and if any of the teeth 124, 126, 128 are in alignment with any slide that particular slide will be pulled toward the rear to index the radio receiver on that particular preset station. In order to properly adjust the selector slide 116 so that its teeth will be opposite the proper slide the various slides 44, 46, 48, 50 and 52 in the remote control head are all of a different operative length. As shown in the drawings, slide 50 has the shortest operating length as at 50′. When the slide is depressed in the head therefor 50′ will engage plunger plate 76 forcing it to the rear against the pressure of spring 80 and move the Bowden wire 82 the least amount of any of the slides. This action would be sufficient to cause the transverse indexing slide 116 to move so that the opposing teeth are opposite slide 92 which is the position shown in FIG. 6. Thus on the operation of this slide, the station preset on slide 92 would be indexed. The next longer projection is that shown on slide 46 and will be identified as tip 44′. When slide 46 is depressed by the operator or driver pushing on the push button 62 tip 44′ now engages plunger plate 76 and since its is longer than tip 50′ would cause the plunger plate 76 to move farther to the rear in FIG. 2 thus forcing the Bowden wire 82 to travel farther and moving plate 116 a freater distance thus causing the opposed teeth 152 to align themselves with the head of slide 90 such that when slide 146 is depressed far enough to actuate the electrical switch the solenoid will move sliding plate 102 to the rear of the receiver and index the station set on this slide. Each slide in the remote control head bears a different length and without specifically describing further it will be obvious that depression of any of these slides will cause the plunger plate 76 to move to different positions, thus adjusting the selector plate 116 so that different opposed tooth combinations align themselves with the heads of different slides and thus index the receiver to the different stations determined by the cams on those slides.

By use of this novel remote control unit any preset station may be automatically tuned in, either at the set itself or from some remote point without the necessity of going through a sequence of stations. The tuning means goes directly to the station desired. Furthermore, the use of remote unit requires a minimum of alteration of present commercial design and is easily and simply installed and connected.

What is claimed is:

1. In radio receiving apparatus having a plurality of mechanically adjustable means for tuning said radio receiving apparatus to a plurality of different predetermined signal frequencies when moved from a position of rest to a fully actuated position, a supplemental tuning unit for the radio receiving apparatus located at a position remote from the radio receiving apparatus, said supplemental tuning unit including a plurality of reciprocably movable manually engageable members, a single reciprocable member engageable by each of the first manually engageable reciprocably movable members and designed to be moved a different distance by each, selector means on said radio receiving apparatus to determine which of the plurality of mechanically adjustable means for tuning may be operated, power operating means for moving the selector means and one of said mechanically adjustable means for tuning to tune the radio receiving apparatus, and interconnecting means extending between the single reciprocable member in the supplemental tuning unit and the selector means to move the latter to different positions depending upon which of the plurality of manually engageable reciprocably movable members is depressed to tune in different stations.

2. In radio receiving apparatus having a plurality of mechanically adjustable means for tuning said radio receiving apparatus to a plurality of different predetermined signal frequencies when moved from a position of rest to a fully actuated position, a supplemental tuning unit for the radio receiving apparatus located at a position remote from the radio receiving apparatus, said supplemental tuning unit including a plurality of reciprocably movable manually engageable members, a single reciprocable member engageable by each of the first manually engageable reciprocably movable members and designed to be moved a different distance by each, selector means on said radio receiving apparatus to determine which of the plurality of mechanically adjustable means for tuning may be operated, power operating means for moving the selector means and one of said mechanically adjustable means for tuning to tune the radio receiving apparatus, interconnecting means extending between the single reciprocable member in the supplemental tuning unit and the selector means to move the latter to different positions depending upon which of the plurality of manually engageable reciprocably movable members is depressed to tune in different stations, and electrical switching means connected to the power operating means and actuated by the manually engageable reciprocably movable members when they are moved by the operator at the conclusion of the stroke so that the first part of the movement of any of the manually engageable reciprocably movable members will mechanically position the selector means and the final portion of movement will actuate the electrical switching means to energize the power operating means and index the radio receiving apparatus.

3. In a radio receiving apparatus having a plurality of presettable push button slides to mechanically tune the radio receiving apparatus to a plurality of predetermined stations, a supplemental remote control unit including a similar number of push button slides reciprocably mounted and of different operating lengths, an indexing plate in said remote control unit reciprocably mounted to be engaged by the ends of the push button slides in the remote control unit and so moved to different positions thereby, selector means supported on said radio receiving apparatus and associated with the push button slides thereof so that different positions will align it with different slides, power actuating means connected to said selector means to rack the same and move any one selected slide in to index the radio receiving apparatus to a desired preset station, and mechanical interconnecting means between the selector means and the indexing plate in the remote control unit to move the selector means to different positions depending upon the position to which the actuated push button slide has forced the indexing plate in the remote control unit.

4. In a radio receiving apparatus having a plurality of presettable push button slides to mechanically tune the radio receiving apparatus to a plurality of predetermined stations, a supplemental remote control unit including a similar number of push button slides reciprocably mounted and of different operating lengths, an indexing plate in said remote control unit reciprocably mounted to be engaged by the ends of the push button slides in the remote control unit and so moved to different positions thereby, selector means supported on said radio receiving apparatus and associated with the push button slides thereof so that different positions will align it with different slides, power actuating means connected to said selector means to rack the same and move any one selected desired preset station, mechanical interconnecting means between the selector means and the indexing plate in the remote control unit to move the selector means to different positions depending upon the position to which the actuated push button slide has forced the indexing plate in the remote control unit, an electrical switch mounted on the remote control unit and actuated by any of the push button slides thereon, and electrical means for connecting said electrical switch to the power actuating means to energize the same when one of the push button slides in the remote control unit is actuated.

No references cited.

ROBERT H. ROSE, *Primary Examiner.*

UNITED STATES PATENT OFFICE

CERTIFICATE OF CORRECTION

Patent No. 3,223,926 December 14, 1965

Terrance W. Maugans

It is hereby certified that error appears in the above numbered patent requiring correction and that the said Letters Patent should read as corrected below.

Column 1, line 29, after "over" insert -- to --; column 3, line 22, for "eo" read -- to --; same column 3, line 29, and column 4, line 10, for "Bodwen", each occurrence, read -- Bowden --; column 4, line 21, for "contracts" read -- contacts --; line 71, for "its" read -- it --; same column 4, line 74, for "freater" read -- greater --; column 5, line 17, after "of" insert -- the --; column 6, line 48, after "selected" insert -- slide in to index the radio receiving apparatus to a --.

Signed and sealed this 25th day of October 1966.

(SEAL)

Attest:

ERNEST W. SWIDER
Attesting Officer

EDWARD J. BRENNER
Commissioner of Patents